United States Patent [19]
Oda

[11] Patent Number: 5,113,245
[45] Date of Patent: May 12, 1992

[54] IMAGE PICKUP APPARATUS AND METHOD FOR REDUCING SMEAR

[75] Inventor: Kazuya Oda, Tokyo, Japan

[73] Assignee: Fuji Photo Film Co., Ltd., Kanagawa, Japan

[21] Appl. No.: 592,805

[22] Filed: Oct. 4, 1990

[30] Foreign Application Priority Data

Oct. 6, 1989 [JP] Japan ................... 1-260187

[51] Int. Cl.⁵ .............................. H04N 9/04
[52] U.S. Cl. ......................... 358/41; 358/43; 358/184; 358/213.24
[58] Field of Search ............ 358/41, 209, 213.15, 358/213.18, 213.19, 213.24, 909, 155, 184, 42, 43, 44, 47

[56] References Cited

U.S. PATENT DOCUMENTS

| | | | |
|---|---|---|---|
| 4,638,352 | 1/1987 | Noda et al. | 358/44 |
| 4,768,094 | 8/1988 | Ichinoi | 358/167 |
| 4,783,702 | 11/1988 | Sone et al. | 358/213.19 |
| 4,884,129 | 11/1989 | Ozawa et al. | 358/44 |

Primary Examiner—Howard W. Britton
Assistant Examiner—Tuan V. Ho

[57] ABSTRACT

An image pickup unit including a charge coupled solid-state image pickup device which performs interlaced scanning read-out which reduces the occurrence of field flicker and color flicker caused by smear. Picture signals of respective colors corresponding to a second field are amplified with amplification factors corresponding to inverse relationships of respective smear components characteristics, which are increased as shutter speed increased. In a second embodiment, the exposure period for picture signals corresponding to the second field of a certain color is controlled to have an inverse relationship to a smear component characteristic, which increases as the shutter speed increases. The picture signals of the remaining colors are amplified accordingly with amplification colors and which are set to inverse relationships to the respective smear components.

22 Claims, 6 Drawing Sheets

IMAGE PICKUP APPARATUS AND METHOD FOR REDUCING SMEAR

BACKGROUND OF THE INVENTION

1. Field of the Invention

The present invention relates to an image pickup apparatus which utilizes a charge coupled solid-state image pickup device of a frame interline transfer system (FIT-CCD), and particularly relates to an image pickup apparatus having an electronic shutter function to perform picking up of an image.

2. Description of Background Art

A charge coupled solid-state image pickup device for use in such an image pickup apparatus has a structure as shown in FIG. 3

That is, a charge coupled solid-state image pickup device is constituted by a drain portion 1 for discharging unnecessary electric charges, a photo-detection portion 2 for photo-detecting an optical image of a subject, a storage portion 3 for temporarily holding signal charges for every picture element produced in the photo-detection portion 2, and a horizontal charge transfer line 4 for reading out the signal charges in the storage portion 3. The charge coupled solid-state image pickup device is formed by a semiconductor production technique.

Further describing the structures of the respective portions, first, in the photo-detection portion 2, a plurality of photo-diodes are arranged in a matrix in vertical and horizontal scanning directions V and H. For example, in the case of a primary color stripe filter, as shown in FIG. 3, color filters of red (R) are laminated on the respective surfaces of a group of photo-diodes arranged in the first column, color filters of green (G) are laminated on the respective surfaces of a group of photodiodes arranged in the second column, and color filters of blue (B) are laminated on the respective surfaces of a group of photodiodes arranged in the third column. These three columns, as a set, are arranged repeatedly in the horizontal scanning direction H. The photodiodes correspond to the respective picture elements. Assuming that these photo-diodes are arranged in M rows (M is an even number) in the vertical scanning direction V, a photo-diode group in an odd numbered row numbered from the side of the drain portion 1 is regarded as a first field, and a photo-diode group in an even numbered row is regarded as a second field.

Vertical charge transfer lines $1_1$ to $1_N$ are formed adjacently to photo-diode groups in the respective columns, and four-phase driving signals $\phi I1$, $\phi I2$, $\phi I3$ and $\phi I4$ are applied to a transfer electrode group (not shown) laminated on the upper surface of the vertical charge transfer lines so as to produce transfer elements to transfer signal charges in the vertical scanning direction V. Further, photo-shield layers are formed on the upper surfaces of all the vertical charge transfer lines $1_1$ to $1_N$ to prevent light from striking the upper surfaces.

Further, transfer gates (for example, shown as a representative by TG in FIG. 3) are provided between respective photodiodes and charge transfer elements in vertical charge transfer lines adjacent thereto, for conducting and therefore transferring signal charges produced in the respective photo-diodes to the charge transfer elements in the vertical charge transfer lines. Then, gate electrodes for driving the transfer gates are formed integrally with the transfer electrodes in the vertical charge transfer lines, and the transfer gates are set in a conductive state by setting driving signals to a high voltage at a predetermined timing.

The drain portion 1 is constituted by a redetermined impurity layer formed so as to connect with the first ends of all the vertical charge transfer lines $1_1$ to $1_N$, for transferring unnecessary charges transferred through the vertical charge transfer lines, to a semiconductor substratum.

The storage portion 3 is constituted by a charge transfer line group provided continuously with the other ends of all the vertical charge transfer lines $1_1$ to $1_N$, and four-phase driving signals $\phi S1$, $\phi S2$, $\phi S3$ and $\phi S4$ are applied to a transfer electrode group (not shown) laminated on the upper surfaces of the vertical charge transfer lines so as to have a function to transfer signal charges from the photo-detection portion 2 in the vertical scanning direction V and hold the signal charges in a predetermined charge transfer element group by stopping the driving signals temporarily. It is therefore possible to produce a transfer element group to temporarily hold signal charges produced in photo-diodes of M/2 lines (that is, one field). Further, photo-shield layers are formed on the upper surfaces of all the vertical charge transfer lines to prevent light from striking the upper surfaces.

The horizontal charge transfer line 4 is connected with the ends of all the charge transfer line groups of the storage portion 3 so as to transfer signal charges in the horizontal scanning direction H synchronously with two-phase driving signals $\phi H1A$ and $\phi H2$ applied to a transfer electrode group (not shown) formed on the upper surface of the horizontal charge transfer line 4. The signal charges transferred synchronously with the two-phase driving signals $\phi H1A$ and $\phi H2$ are impedance-converted in a floating diffusion amplifier 5 synchronously with a reset signal $\phi RS$ and an output gate signal $\phi H1B$, and supplied to an output terminal 6 as a color signal for every picture element.

FIG. 4 shows image pickup timing in an electronic still camera or the like having an electronic shutter function, and FIGS. 5(a) to 5(h) show the operations at respective points in time t1 to t8. Then, for the purpose of simplification of description, FIG. 5 shows read-out scanning about a group of picture elements of three columns and two rows of red (R), blue (B) and green (G) which are adjacent to one another, as representative.

Describing the operation with reference to FIGS. 4 and 5, first, VD in FIG. 4 assumes an "H" level every 1/60 second.

Assuming that a shutter release button of an electronic still camera is pushed at the point of time t1, a charge transfer mode for a first field is set, and synchronously with that, the four-phase driving signals $\phi S1$, $\phi S2$, $\phi S3$ and $\phi S4$ are set to an "M" level (voltage for producing a transfer element in a vertical charge transfer line) and at the same time, only the driving signal I1 is set in a high voltage "HH", so that as shown in FIG. 5(a), a transfer gate corresponding to the first field is made conductive (that is, the potential level thereof becomes deeper than that of the photo-diodes), so that unnecessary charges in all the photo-diodes in the first field are transferred to a transfer element in an adjacent vertical charge transfer line. At the same time, the charge transfer operation of the horizontal charge transfer line 4 starts so as to discharge unnecessary charges in the horizontal charge transfer line 4 to the outside through the floating diffusion amplifier 5 within a predetermined period.

Next, the charge transfer mode for the first field is switched to that for a second field, and only the driving signal φI3 is set to a high voltage "HH" at the point of time t2, so that as shown in FIG. 5(b), a transfer gate corresponding to the second field is made conductive so that unnecessary charges in all the photo-diodes in the second field are transferred to a transfer element in an adjacent vertical charge transfer line.

By these transfer operations at the points of time t1 and t2, unnecessary residual charges in all the photo-diodes are transferred to the vertical charge transfer lines.

Next, in a predetermined period in a vertical fly-back period, the vertical charge transfer lines of the photo-detection portion 2 and the charge transfer lines of the storage portion 3 transfer and issue unnecessary charges to the side of the drain portion 1 synchronously with the driving signals φI1 to φI4 and φS1 to φS4. FIG. 5(c) shows a certain point of time t3 in the above transfer operation.

Next, at a point of time t4 of completion of the discharge operation of all unnecessary charges, the charge transfer mode for the second field is switched to that for a first field again, the driving signal φI1 is set to a high voltage "HH" in the same manner as at the point of time t1, so that as shown in FIG. 5(d), a transfer gate corresponding to the first field is made conductive, so that charges in all the photo-diodes in the first field are transferred to a transfer element in an adjacent vertical charge transfer line. That is, a period τ1 from the point of time of making the transfer gate non-conductive after the point of time t1 till the point of time of making the transfer gate conductive is an exposure time of a photo-diode group corresponding to the first field.

Next, by a high speed charge transfer operation in a predetermined period, signal charges in the vertical charge transfer lines are transferred to the charge transfer lines of the storage portion 3. FIG. 5(e) shows the operation at a certain point of time t5 in the transfer operation. When this transfer operation is completed, all the signal charges of the photo-diode group corresponding to the first field are held by the storage portion 3.

Next, the charge transfer mode for the first field is switched to that for a second field again, and the driving signal φI3 is set in a high voltage "HH" at a point of time t6 after the lapsing of the period τ2 from the point of time t2, so that as shown in FIG. 5(f), a transfer gate corresponding to the second field is made conductive, so that charges in all the photo-diodes in the second field are transferred to a transfer element in an adjacent vertical charge transfer line. That is, the period τ2 from the point of time of making the transfer gate non-conductive after the point of time t2 till the point of time t6 of making the transfer gate conductive again is an exposure time of a photo-diode group corresponding to the second field.

Next, while the signal charges corresponding to the second field are left stopped in the vertical charge transfer lines, the signal charges corresponding to the first field in the storage portion 3 are vertical-charge-transferred to the horizontal charge transfer line 4, and at the same time, the horizontal charge transfer line 4 performs horizontal charge transfer every vertical charge transfer of one horizontal line, so as to output color signals corresponding to respective picture elements corresponding to the first field (in the period Δτ1 in FIG. 4).

When read-out of the signal charges in the storage portion 3 is completed, signal charges in the vertical charge transfer lines of the photo-detection portion 2 (charges corresponding to the second field) are thereafter transferred to the storage portion 3. This state is shown in FIG. 5(g) corresponding to the point of time t7.

Next, when all the signal charges corresponding to the second field are transferred to the storage portion 3, the signal charges are vertical-charge-transferred to the horizontal charge transfer line 4, and at the same time, the horizontal charge transfer line 4 performs horizontal charge transfer every time vertical charge transfer of one horizontal line is carried out so as to output color signals corresponding to respective picture elements corresponding to the second field (in the period Δτ2 in FIG. 4). This state is shown in FIG. 5(h).

As has been described, by making a reset operation synchronously with a shutter release button and transferring signal charges integrated in photo-diodes to vertical charge transfer lines corresponding to a shutter speed, it is possible to obtain an artificial frame electronic shutter function.

However, in such a conventional image pickup apparatus, there has been a problem that field and color flicker becomes conspicuous as the shutter speed is made higher.

That is, as shown in a timing chart in FIG. 4, since signal charges corresponding to a second field are read after signal charges corresponding to a first field are read, the signal charges corresponding to the second field are stopped in vertical charge transfer lines in a photo-detection portion temporarily, so that a smear produced in this stop period is mixed in the signal charges corresponding to the second field, and this smear component causes flicker. In FIG. 4, the smear component is mixed in the signal charges corresponding to the second field in a period τ1, and the influence of a smear to the signal charges corresponding to the second field becomes larger than that to the first charges corresponding to the first field.

It is thought that this smear component is caused by light incident through an opening portion of a photo-diode which is reflected by a silicon oxide film under a charge transfer line and which reaches a vertical charge transfer line. Other causes of smear may be high intensive light which produces unnecessary charges in a semiconductor substratum, or incident light penetrating a photo-shield film formed on the upper surface of a vertical charge transfer line, or the like.

Further, as shown in FIG. 6, because of different mixture rates of smear components in respective color signals of red (R), green (G) and blue (B), there has been a problem of not only field flicker, in the case of still picture reproduction, but also color flicker in the case of reproduction of a color picture.

That is, FIG. 6 shows the level difference (indicated by percent) between picture element signals read from picture elements corresponding to first and second fields, by shutter speed and colors of red (R), green (G) and blue (B) in the case of picking up an image by a conventional artificial frame electronic shutter function. As is apparent from FIG. 6, since incident light intensity is higher as the shutter speed is increased, a smear component in a picture element signal corresponding to the second field is more increased than that in a picture element signal corresponding to the first field, and if the difference reaches more than about 1 percent, flicker can be recognized easily by human eyes. Moreover, since there are different characteristics in regard to the shutter speed among the three primary colors of red (R), blue (B) and green (G), not only luminance-based field flicker but also color-based color flicker are produced.

SUMMARY OF THE INVENTION

It is therefore an object of the present invention to solve the foregoing problems in the prior art.

It is another object of the present invention to provide an image pickup apparatus in which field flicker as well as color flicker is reduced.

In order to attain the foregoing objects, according to an aspect of the present invention, provided is an image pickup apparatus in which exposure is performed by a picture element group of a photo-detection portion in a period corresponding to the shutter speed, after elimination of unnecessary charges in an FIT-CCD. By interlaced scanning read-out, picture signals of a picture element group corresponding to a first field are read out, and then picture signals of a picture element group corresponding to a second field are read out to thereby effect an artificial frame shutter function. The image pickup apparatus has a feature that picture signals of respective colors read-out from the picture element group corresponding to the second field are amplified by an amplifier having amplification factors which correspond to the respective colors and are set in inverse relationship to characteristics of a smear component which are increased as the shutter speed becomes high.

That is, as shown in FIG. 6, the higher the shutter speed, the more a smear component increases and the greater the mixture rates of the smear components in respective colors differ from each other. Assuming that the shutter speed is T, and in the case of photographing a subject which is of constant luminance, color signals read-out from picture elements about red (R) in first and second fields are $R_1(T)$ and $R_2(T)$ respectively, then a characteristic curve $A_R(T)$ of a smear mixture rate about red (R) in FIG. 6 is expressed by:

$$A_R(T) = \left[ \frac{R_2(T)}{R_1(T)} \right] - 1 \times 100[\%] \quad (1)$$

In the same manner, those about green (G) and blue (B) are expressed as follows:

$$A_G(T) = \left[ \frac{G_2(T)}{G_1(T)} \right] - 1 \times 100[\%] \quad (2)$$

$$A_B(T) = \left[ \frac{B_2(T)}{B_1(T)} \right] - 1 \times 100[\%] \quad (3)$$

By considering such a characteristic, a color signal read-out from a picture element about red (R) corresponding to a second field is amplified with an amplification factor $G_R(T)$ established in the inverse relationship of the above expression (1), that is $$G_R(T) = \frac{K_R \times R_1(T)}{R_2(T) - R_1(T)} \quad (4)$$

[where $K_R$ is a coefficient for adjustment]
so as to correct levels of color signals of red (R) corresponding to the first and second fields to thereby reduce field flicker about red.

In the same manner, green (G) in the second field is amplified with an amplification factor expressed by:

$$G_G(T) = \frac{K_G \times G_1(T)}{G_2(T) - G_1(T)} \quad (5)$$

[where $K_G$ is a coefficient for adjustment]
Blue (B) in the second field is amplified with an amplification factor expressed by:

$$G_B(T) = \frac{K_B \times B_1(T)}{B_2(T) - B_1(T)} \quad (6)$$

[where $K_B$ is a coefficient for adjustment]
By adjusting the coefficients $K_R$, $K_G$ and $K_B$ in the above expressions (4) to (6), the displacement in characteristics among red (R), green (G) and blue (B) is corrected so that not only field flicker but also color flicker are corrected at the same time.

According to another aspect of the present invention, provided is an image pickup apparatus in which exposure is performed by a picture element group of a photo-detection portion in a period corresponding to the shutter speed after elimination of unnecessary charges in an FIT-CCD. By interlaced scanning read-out, picture signals of a picture element group corresponding to a first field are read out, and then picture signals of a picture element group corresponding to a second field are read out to thereby effect an artificial frame shutter function. The image pickup apparatus has a feature that the exposure period of a picture element group corresponding to the second field is controlled at a special color so as to have an inverse relationship to a characteristic of a smear component which is increased as shutter speed becomes high, and picture signals of the remaining colors are amplified by an amplifier having amplification factors which correspond to the respective colors and are set in inverse relationship to characteristics of a smear component which are increased as shutter speed becomes high.

For example, in the case where red (R) is specified, in order to correct a smear component of a color signal read-out from a picture element about red (R) in the second field, an exposure period of the second field is changed relative to that of the first field in an inverse relationship to the characteristic of smear mixture to the shutter speed as shown in FIG. 6. Then, since the above expression (1) is satisfied for red (R), the exposure period $\tau 2$ of the second field is expressed as follows, on the assumption that the exposure period of the first field at the shutter speed T is $\tau 1$:

$$\tau 2 = \tau 1 \frac{\lambda \times R_1(T)}{R_2(T) - R_1(T)} \quad (7)$$

[where $\lambda$ is a coefficient for adjustment]
Thus, by the above expression (7), field flicker about a color signal of red (R) is reduced.

However, when the exposure period is controlled on the basis of red (R), correction about the remaining colors green (G) and blue (B) is not sufficient because there is some scattering in smear mixture characteristics of the respective colors. Therefore, correction about the remaining colors is achieved by an amplifier having an amplification factor established with an inverse relationship to that in FIG. 6, after reading, so that the influence of a smear component with respect to all the colors in the both fields is finally reduced. That is, on the basis of the above expressions (5) and (6), an amplification factor about green (G) is established by:

$$G_G = \frac{\lambda_G \times G_1(T)}{G_2(T) - G_1(T)} \quad (8)$$

[$\lambda_G$ is a coefficient for adjustment]
and as for blue (B) in the second field:

$$G_B(T) = \frac{\lambda_B \times B_1(T)}{B_2(T) - B_1(T)} \quad (8)$$

[$\lambda_B$ is a coefficient for adjustment]

By establishing the coefficients $\lambda_G$ and $\lambda_B$ properly, the displacement in smear generating characteristics among the respective colors is adjusted.

Although the case where red (R) is specified has been described as an example, needless to say, another color may be specified.

According to a further aspect of the present invention, provided is an image pickup apparatus in which exposure is performed by a picture element group of a photo-detection portion in a period corresponding to the shutter speed after elimination of unnecessary charges in an FIT-CCD. By interlaced scanning readout, picture signals of a picture element group corresponding to a first field are read out, and then picture signals of a picture element group corresponding to a second field are read out to thereby effect an artificial frame shutter function. The image pickup apparatus has a feature that when respective signal charges in a picture element group corresponding to the second field at a special color are transferred to a vertical charge transfer line through a transfer gate, a voltage applied to the transfer gate is controlled so that a potential level under the transfer gate has an inverse relationship to a characteristic of a smear component which is increased as the shutter speed becomes high. Therefore, charges corresponding to a smear component mixed while signal charges are held in the vertical charge transfer line are left in the respective picture elements. On the other hand, while signal charges about the remaining colors are read-out in the usual signal reading manner, the thus read-out color signals are amplified by an amplifier having amplification factors which correspond to the respective colors and are set in an inverse relationship to characteristics of a smear component which are increased as the shutter speed becomes high.

That is, upon read-out of color signals from certain special picture elements corresponding to a second field, a processing equivalent to subtracting the quantity of charges corresponding to a mixed smear component from signal charges is performed by temporarily holding the signal charges in a vertical charge transfer line, so that there is seemingly no smear component in the color signals finally read out. As for the other colors, smears are compensated by processings shown in the above expressions (8) and (9).

The present invention including the above-mentioned aspects is not limited to the case of reproducing an image through color-separation into the three primary colors of red (R), green (G) and blue (B). The present invention is applicable to an image pickup device for reproducing an image with the complementary colors of those three primary colors in the same manner.

According to the present invention provided with such flicker reduction means, it is possible to almost equalize smear component influences of color signals of respective colors read-out from picture elements corresponding to a first field and those read-out from picture elements corresponding to a second field with respect to each other, so that it is possible to reduce the production of field flicker and color flicker at the same time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features and advantages of the present invention will be apparent from the following description taken in connection with the accompanying drawings which are given by way of illustration only, and thus are not limitative of the present invention, and wherein.

DETAILED DESCRIPTION OF THE PREFERRED EMBODIMENTS

Figure 1:
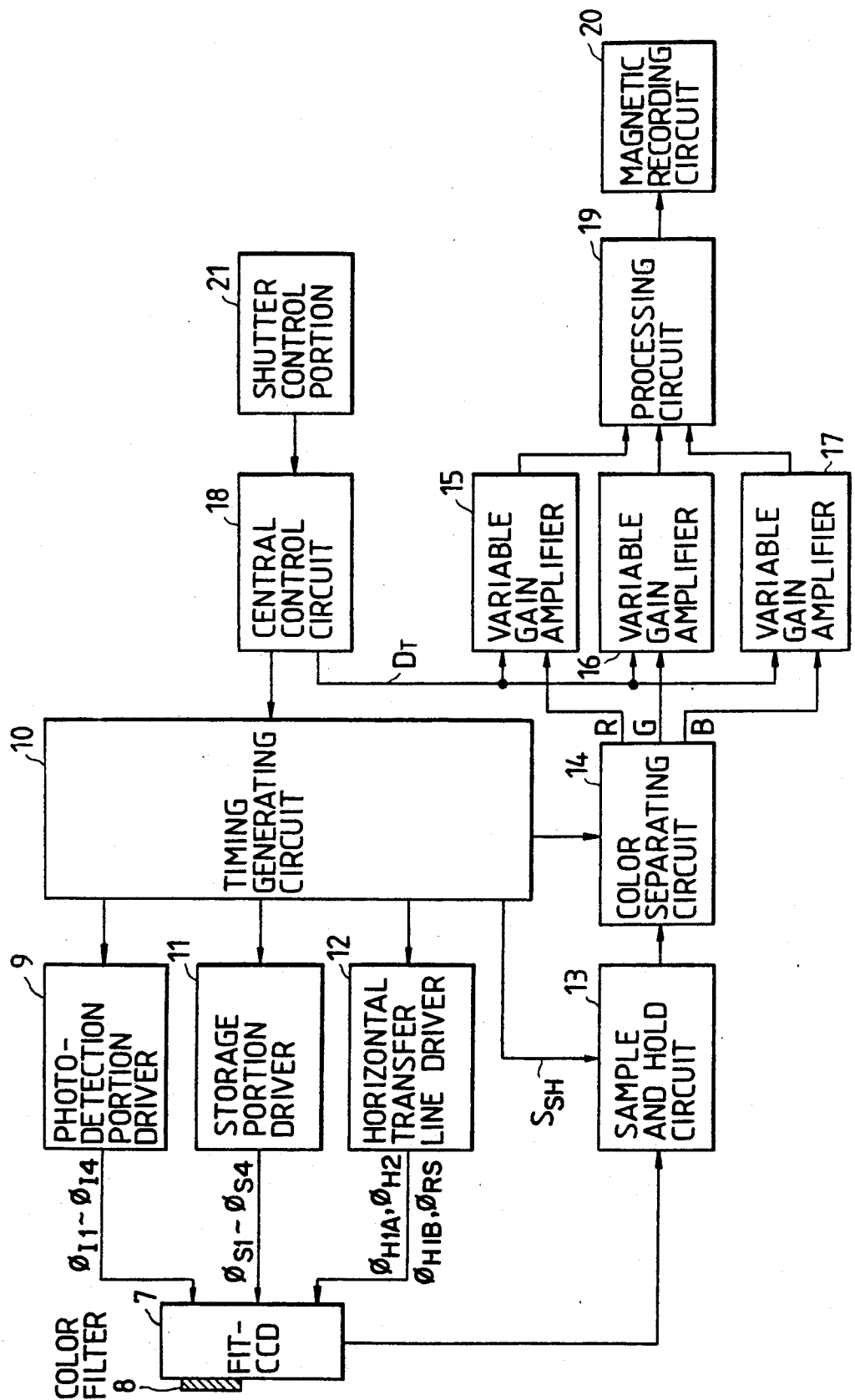
FIG. 1 is a diagram illustrating the configuration of an embodiment of the present invention.
Figure 3:
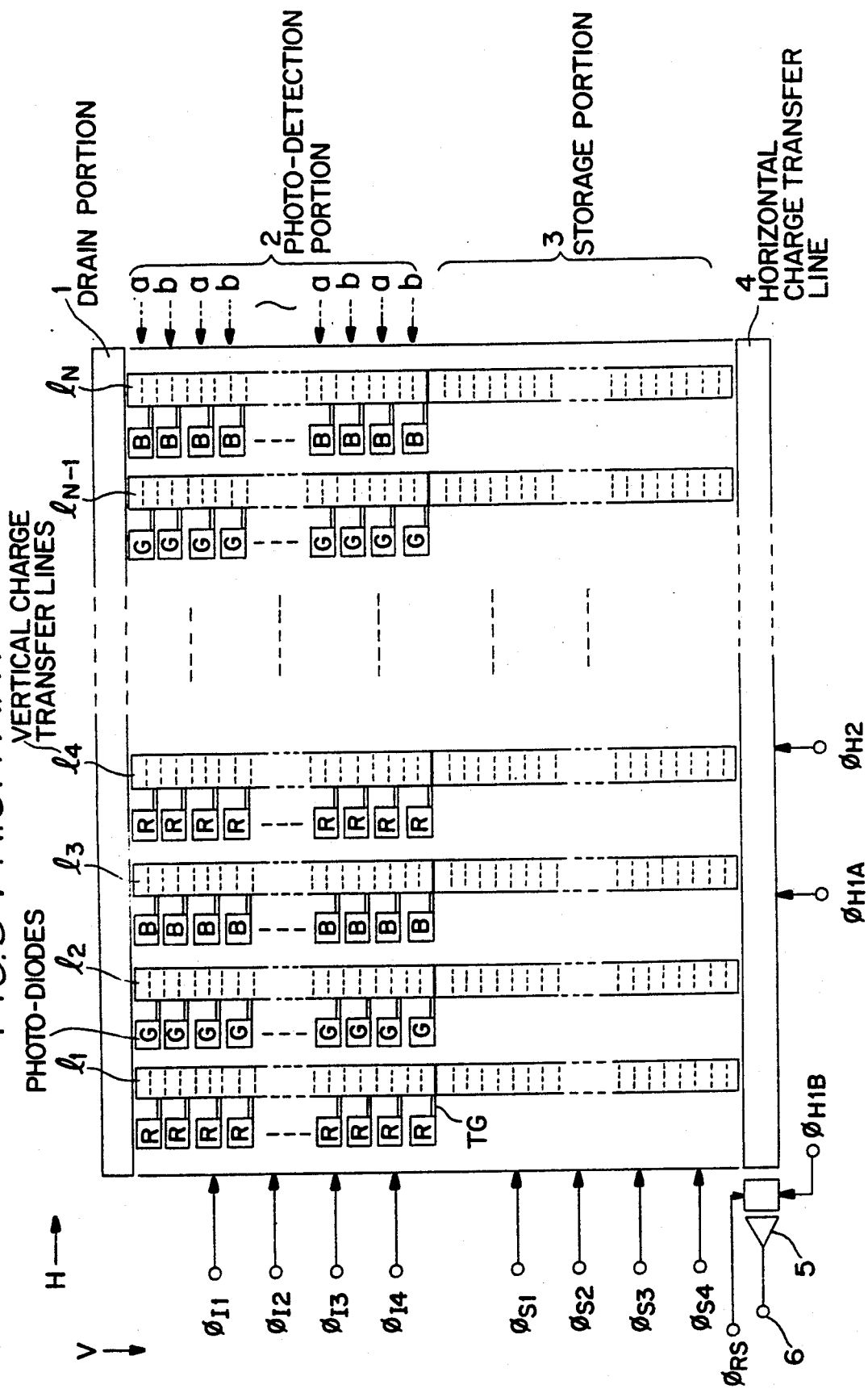
FIG. 3 is a diagram illustrating the structure of a charge coupled solid-state image pickup device of a frame interline transfer system.

An embodiment of the present invention will be described with reference to FIG. 1. FIG. 1 shows the structure of an image pickup apparatus in an electronic still camera. As an image pickup device, an FIT-CCD the same as that illustrated in FIG. 3 is utilized.

First, the structure will be described. In FIG. 1, the reference numeral 7 represents a charge coupled solid-state image pickup device of a frame interline transfer system (FIT-CCD). In the same manner as that shown in FIG. 3, a red (R), blue (B) and green (G) stripe color filter 8 is formed on the photo-detection surface of the image pickup device 7 to detect an optical image of a subject.

The reference numeral 9 represents a photo-detection portion driver which produces four-phase driving signals $\phi I1$ through $\phi I4$ for driving vertical charge transfer lines in a photo-detection portion (see FIG. 3) of the charge coupled solid-state image pickup device 7 synchronously with a synchronizing signal from a timing generating circuit 10.

The reference numeral 11 represents a storage portion drive which produces four-phase driving signals $\phi S1$ through $\phi S4$ for driving charge transfer lines in a storage portion (see FIG. 3) synchronously with a synchronizing signal from the timing generating circuit 10.

The reference numeral 12 represents a horizontal transfer line driver which produces two-phase driving signals φH1A and φH2 for driving a horizontal charge transfer line (see FIG. 3), a gate signal φH1B for driving a gate, and a reset signal φRS synchronously with a synchronizing signal from the timing generating circuit 10.

The reference numeral 13 represents a sample and hold circuit which samples color signals supplied through the horizontal charge transfer line (see FIG. 3) by means of a correlation double sampling system synchronously with a timing signal from the timing generating circuit 10.

The reference numeral 14 represents a color separating circuit which separates the time series color signals sampled in the sample and hold circuit 13 into color signals of respective colors, red (R), blue (B) and green (G), and outputs the separated color signals.

The reference numeral 15 represents a variable gain amplifier which has an amplification factor established so as to correspond to the above-mentioned expression (4) so that the variable gain amplifier 15 amplifies a red (R) color signal with the amplification factor corresponding to the data $D_T$ of the shutter speed T indicated from a central control circuit 18 and outputs the amplified red (R) color signal.

The reference numeral 16 represents a variable gain amplifier which has an amplification factor established so as to correspond to the above-mentioned expression (5), so that the variable gain amplifier 16 amplifies a green (G) color signal with the amplification factor corresponding to the data $D_T$ of the shutter speed T indicated from the central control circuit 17 and outputs the amplified green (G) color signal.

The reference numeral 17 represents a variable gain amplifier which has an amplification factor established so as to correspond to the above-mentioned expression (6), so that the variable gain amplifier 17 amplifies a blue (B) color signal with an amplification factor corresponding to the data $D_t$ of the shutter speed T indicated from the central control circuit 18 and outputs the amplified blue (B) color signal.

The reference numeral 19 represents a processing circuit which performs a processing such as white balance adjustment or γ-correction upon the respective color signals supplied from the variable gain amplifiers 15 through 17, and then forms and outputs a luminance signal and a color difference signal.

The reference numeral 20 represents a magnetic recording circuit which FM-modulates the luminance signal and the color difference signal supplied from the processing circuit 19 and records the FM-modulated signals in a recording medium such as a magnetic disk or the like.

The reference numeral 21 represents a shutter control portion which supplies the central control circuit 18 with a signal indicating the fact that an operator has pushed a shutter release button so as to start a series of image pickup operations with an electronic shutter function.

Next, the operation of an electronic still camera having such a configuration will be described. Assume that control timing is the same as that in FIG. 4, and that an operator pushes a shutter release button at a point of time t1 after setting the shutter speed T. Then, an instruction regarding the starting of image pickup is given to the central control circuit 18 from the shutter control portion 21, and the data $D_T$ of the shutter speed designated by the operator is held in the central control circuit 18.

Then, at the point of time t1, a charge transfer mode for a first field is established. Synchronously with the establishment of the four-phase driving signals, only the driving signal φI1 is set to an "HH" level while the remaining driving signals φI2, φI3 and φI4 are left in an "M" level (a voltage for producing a transfer element in a vertical charge transfer line) so that a transfer gate corresponding to a first field is made conductive (that is, the potential level thereof is made deeper than that of a photo-diode) so as to transfer unnecessary charges in all the photo-diodes of the first field to a transfer element of an adjacent vertical charge transfer line. At the same time, the horizontal charge transfer line starts a charge transfer operation so as to discharge unnecessary charges in the horizontal charge transfer line to the outside through a floating diffusion amplifier within a predetermined period.

Next, the charge transfer mode for the first field is switched to that for a second field, and only the driving signal φI3 is set in a high voltage level "HH" at a point of time t2 so that a transfer gate corresponding to a second field is made conductive so as to transfer unnecessary charges in all the photo-diodes in the second field to a transfer element in an adjacent vertical charge transfer line.

Through these transfer operations at the points of time t1 and t2, unnecessary residual charges in all the photo-diodes are transferred to the vertical charge transfer lines.

Next, in a predetermined period in a vertical fly-back period, the vertical charge transfer lines of the photo-detection portion and the charge transfer lines of the storage portion transfer unnecessary charges to the side of the drain portion 1 synchronously with the driving signals φI1 through φI4 and φS1 through S4 to thereby discharge those unnecessary charges.

Next, at a point of time t4 when the discharge operation of all the unnecessary charges is completed, the charge transfer mode for the second field is switched to that for a first field again, the driving signal φI1 is set to a high voltage level "HH" in the same manner as at the point of time t1, so that a transfer gate corresponding to a first field is made conductive so as to transfer charges in all the photo-diodes in the first field to a transfer element in an adjacent vertical charge transfer line. That is, a period τ1 from the point of time of making the transfer gate non-conductive after the point of time t1 till the point of time of making the transfer gate conductive again is an exposure time of photo-diode group corresponding to the first field.

Next, by a high speed charge transfer operation in a predetermined period, signal charges in the vertical charge transfer lines are transferred to the charge transfer lines of the storage portion. When this transfer operation is completed, all the signal charges of the photo-diode group corresponding to the first field are held by the storage portion.

Next, the charge transfer mode for the first field is switched to that for a second field again, and the driving signal φI3 is set to a high voltage level "HH" at a point of time t6 after the lapsing of the period τ2 from the point of time t2, so as to make a transfer gate corresponding to a second field conductive, so as to transfer charges in all the photodiodes in the second field to a transfer element in an adjacent vertical charge transfer line. That is, the period τt from the point of time of making the transfer gate non-conductive after the point of time t1 till the point of time t6 of making the transfer gate conductive again is an exposure time of a photodiode group corresponding to the second field.

Next, while the signal charges corresponding to the second field are left stopped in the vertical charge transfer lines, the signal charges corresponding to the first field in the storage portion are vertical-charge-transferred to the horizontal charge transfer line, and at the same time, the horizontal charge transfer line performs horizontal charge transfer for every vertical charge transfer of one horizontal line so as to output time series signals. The sample and hold circuit 13 samples the outputted time series signals synchronously with a predetermined timing so as to output picture element signals corresponding to respective picture elements, the picture element signals being separated for every color in the color separating circuit 14. In a period of reading the signal charges corresponding to the first field, on the basis of an instruction from the central control circuit 18, all of the amplification factors of the variable gain amplifiers 15 through 17 are set to a constant value, and after performing various correction processings in the processing circuit 19, the signal charges are recorded in the magnetic recording circuit 20.

When reading-out of the signal charges corresponding to the first field in the storage portion is completed, signal charges in the vertical charge transfer lines of the photo-detection portion are transferred to the storage portion, and at the same time, on the basis of an instruction from the central control circuit 17, the respective amplification factors of the variable gain amplifiers 15 through 17 are set to predetermined factors corresponding to the shutter speed.

Next, the signal charges corresponding to the second field in the storage portion are vertical-charge-transferred to the horizontal charge transfer line 4, and at the same time, the horizontal charge transfer line performs horizontal charge transfer for every vertical charge transfer of one horizontal line, so as to output color signals corresponding to respective picture elements. In this reading operation, the color signals are amplified with predetermined amplification factors $G_R(T)$, $G_G(T)$ and $G_B(T)$ corresponding to the shutter speed which are set in the variable gain amplifiers 15 to 17, so that the influence of a smear onto the color signals corresponding to the second field is made equal to that onto the color signals corresponding to the first field, and the influences of smear for every field and for every color are made uniform.

As has been described above, by performing a reset operation synchronously with a shutter release button and by transferring signal charges integrated in photodiodes onto vertical charge transfer lines in accordance with the shutter speed, it is possible to obtain an artificial frame electronic shutter function to reduce flicker.

Next, another embodiment will be described with reference to FIG. 2.

Figure 2:
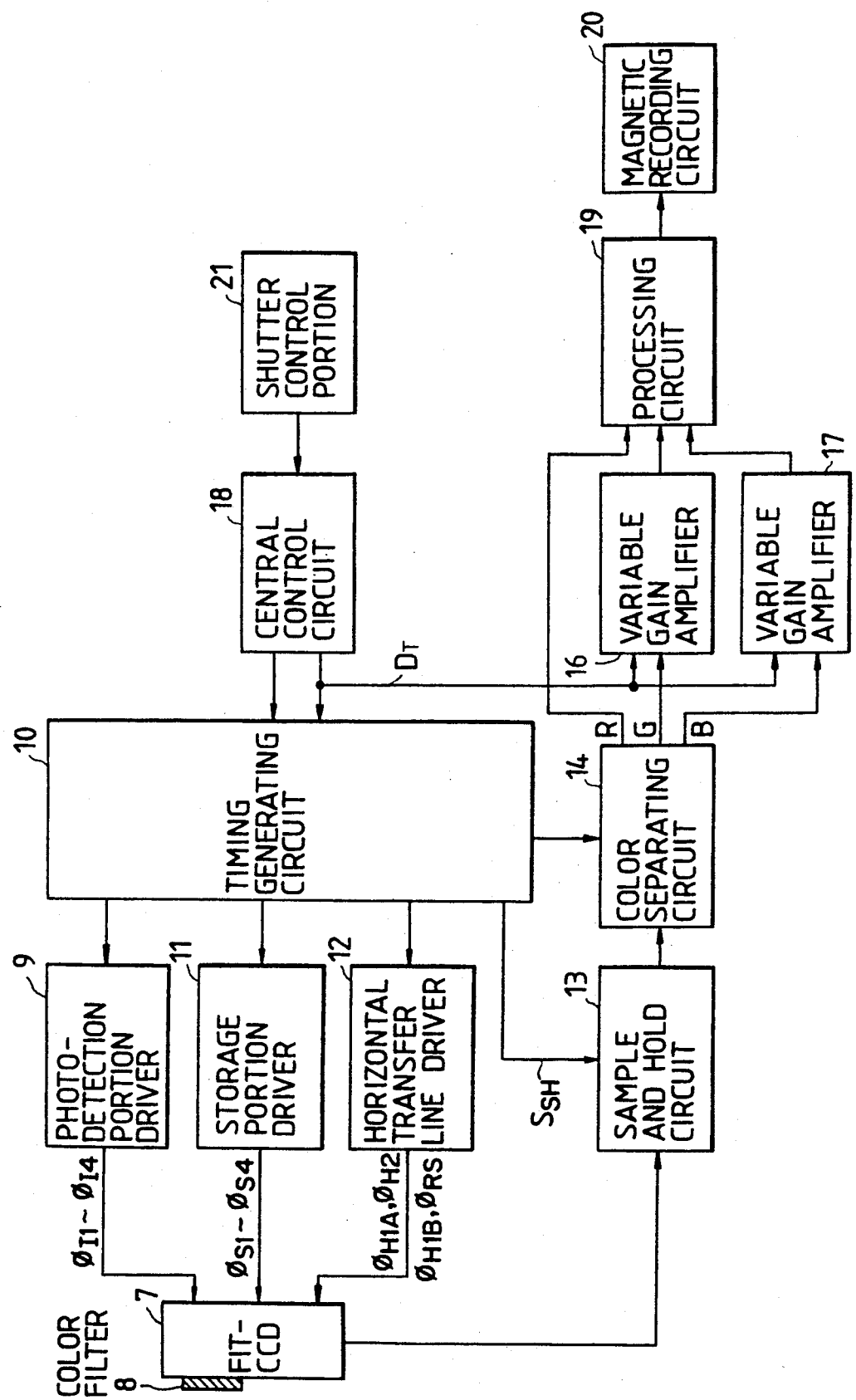
FIG. 2 is a diagram illustrating the configuration of another embodiment of the present invention.

In FIG. 2, the parts the same as or corresponding to those in FIG. 1 are referenced accordingly. Elements and operation different from that of FIG. 1 will hereinafter be described. Variable gain amplifiers 16 and 17 similar to those in the first embodiment are provided only for green (G) and blue (B) color signals without the provision of a variable gain amplifier for a red (R) color signal. Moreover, the timing generating circuit 10 establishes an exposure period $\tau 2$ of a second field corresponding to the data $D_T$ of the shutter speed T from the central control circuit 18 on the basis of the above-mentioned expression (7). In order to set this exposure period $\tau T$, the timing generating circuit 10 controls the operation timing of a photo-detection portion driver 11, the horizontal transfer line driver 12, the sample and hold circuit 13 and the color separating circuit 14.

Figure 4:
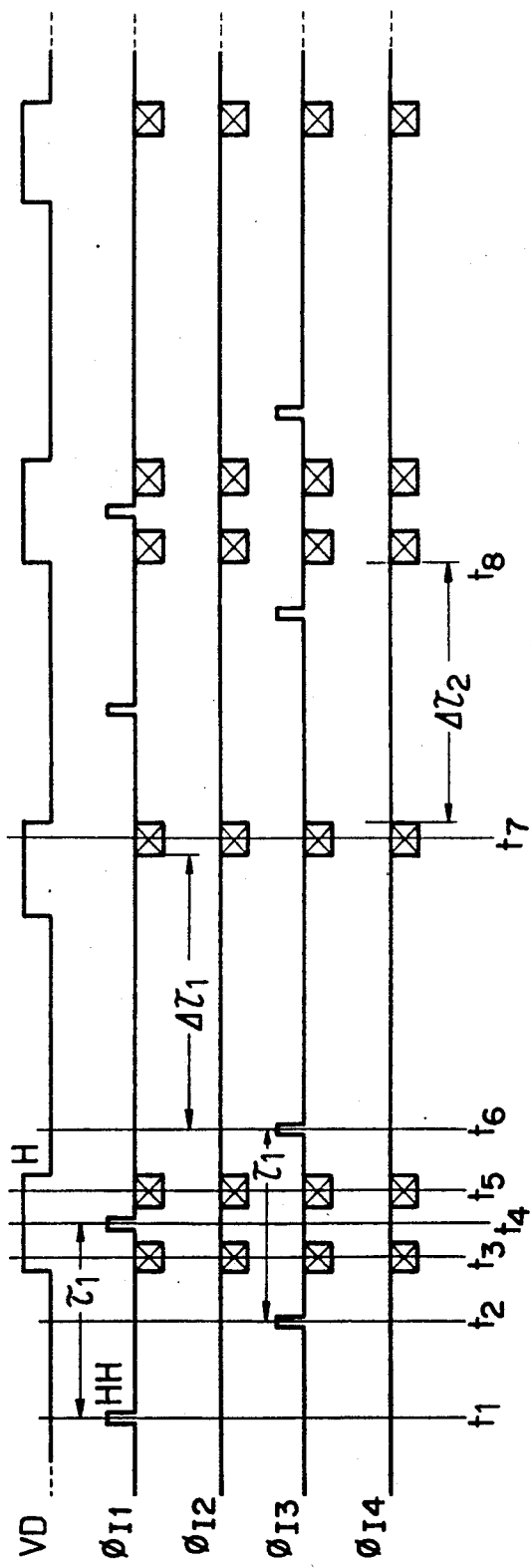
FIG. 4 is a timing chart for explaining the operation of the charge coupled solid-state image pickup device of FIG. 3.
Figure 5A:
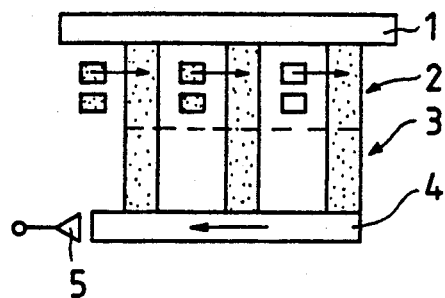
FIGS. 5a–5h are diagrams for explaining the operation at some points in time in FIG. 4.
Figure 5B:
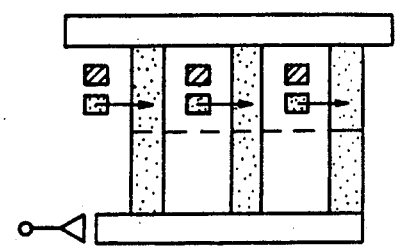
Figure 5C:
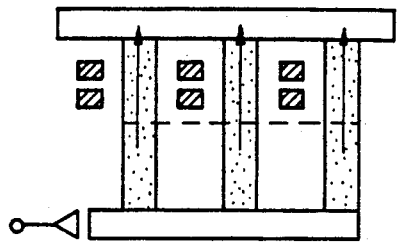
Figure 5D:
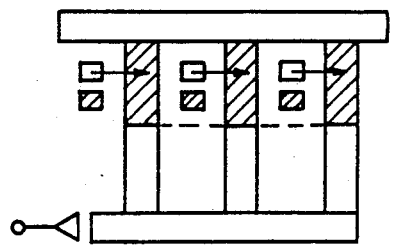
Figure 5E:
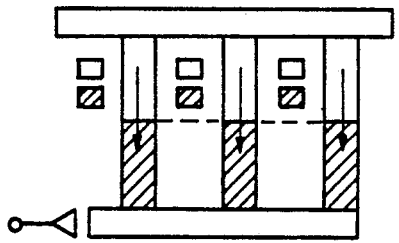
Figure 5F:
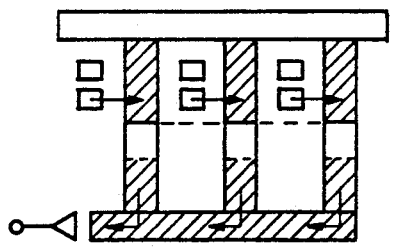
Figure 5G:
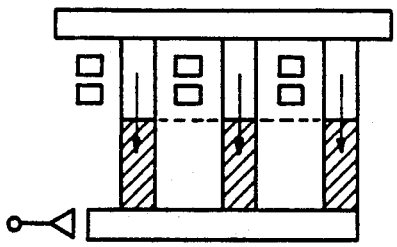
Figure 5H:
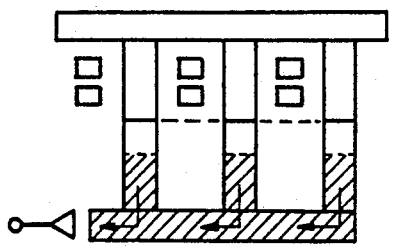
Figure 6:
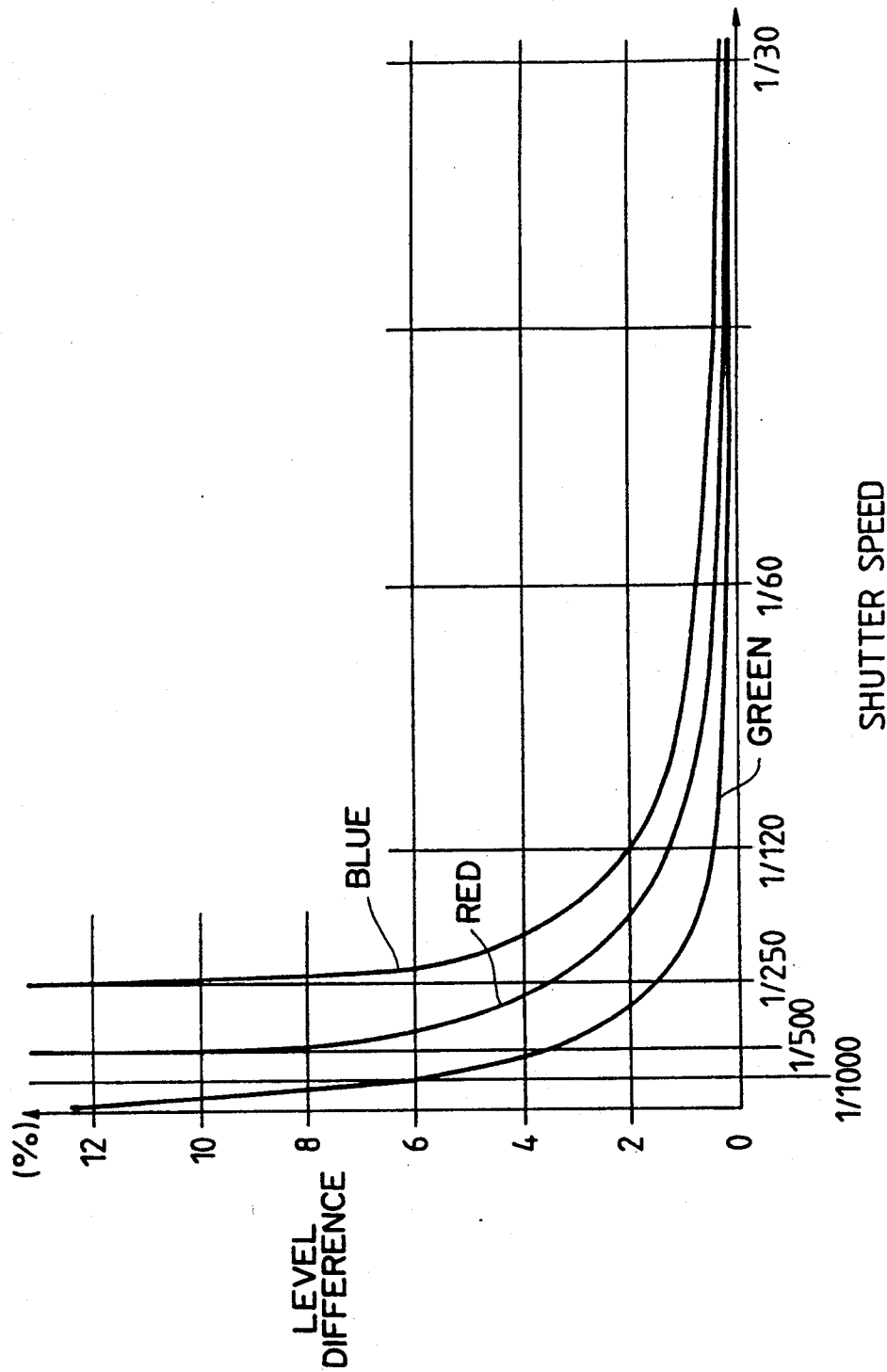
FIG. 6 is a diagram of a smear characteristic curve.

Next, the operation of this second embodiment will be described. Although the same operation as the timing chart shown in FIG. 4 is performed, the point of time of producing a high voltage signal "HH" of a driving signal $\phi 13$, which is shown at a point of time t6 in FIG. 4, is changed on the basis of the above-mentioned expression (7). As a result, it is possible to almost equalize the influences of flicker onto color signals corresponding to the first and second fields.

Further, the respective amplification factors of the variable gain amplifiers 16 and 17 are established from the above-mentioned expression (8) and (9) on the basis of the indicated data $D_T$ from the central control circuit 18, so that it is possible to almost equalize the influences of smears onto color signals corresponding to the first and second fields.

According to this second embodiment, in comparison with the first embodiment, since the number of variable gain amplifiers can be reduced by one, it is possible to miniaturize and simplify the signal processing system.

Moreover, as has been shown in the above summary, it is possible that with respect to a certain special color corresponding to a second field, mixing of smear is corrected by controlling the potential level of a transfer gate. With respect to the other colors, in the same manner as those in the previous embodiment, read-out color signals are amplified with corresponding amplification factors to provide compensation.

As has been described above, according to the present invention, since it is possible to seemingly almost equalize smear mixture rates of respective signal charges corresponding to first and second fields, it is possible to reduce production of field flicker as well as color flicker, and it is therefore possible to provide a clear reproduced picture.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image pickup apparatus in which unnecessary charges produced in picture elements of a charge coupled solid-state image pickup device of a frame interline transfer system are firstly discharged, signal charges corresponding to a first field and signal charges corresponding to a second field are transferred to a storage portion and a vertical charge transfer line of a photo-detection portion, respectively, after lapsing of an exposure period corresponding to a shutter speed from a point of time of said discharge of unnecessary charges, and said signal charges corresponding to said second field are read out after reading-out said signal charges corresponding to said first field while said signal charges corresponding to said second field are stopped in said vertical charge transfer line of said photo-detection portion, whereby an artificial frame shutter image pickup is carried out, the improvement wherein:

picture signals of respective colors read-out from a picture element group corresponding to said second field are amplified by an amplifier having amplification factors which correspond to said respective colors, respectively, and which are set so as to have an inverse relationship to characteristics in which a smear component increases as the shutter speed becomes high.

2. An image pickup apparatus in which unnecessary charges produced in picture elements of a charge coupled solid-state image pickup device of a frame interline transfer system are firstly discharged, signal charges corresponding to a first field and signal charges corresponding to a second field are transferred to a storage portion and a vertical charge transfer line of a photodetection portion, respectively, after lapsing of an exposure period corresponding to a shutter speed from a point of time of said discharge of unnecessary charges, and said signal charges corresponding to said second field are read out after reading-out said signal charges corresponding to said first field while said signal charges corresponding to said second field are stopped in said vertical charge transfer line of said photo-detection portion, whereby an artificial frame shutter image pickup is carried out, the improvement wherein:

said image pickup apparatus comprises a control means for controlling the quantities of respective signal charges with respect to a specific color transferred from a picture element group corresponding to said second field so as to have an inverse relationship to characteristics in which a smear component increases as the shutter speed becomes high, and in that picture signals of remaining colors are amplified by an amplifier having amplification factors which correspond to said remaining colors, respectively, and which are set so as to have an inverse relationship to characteristics in which a smear component increases as the shutter speed becomes high.

3. A method of operating an image pickup apparatus comprising the steps of:

discharging residual charges produced in picture elements of the image pickup apparatus;

transferring accumulated signal charges of the picture elements which correspond to a first field to respective vertical charge transfer lines, said accumulated signal charges of the first field produced during a first exposure period;

transferring accumulated signal charges of the first field from the vertical charge transfer lines to respective storage charge transfer lines;

transferring accumulated signal charges of the picture elements which correspond to a second field to respective vertical charge transfer lines, said accumulated charges of the second field produced during a second exposure period;

reading-out accumulated signal charges of the first field from the respective storage charge transfer lines to amplification means to output amplified time series picture element signals of the first field from said amplification means;

transferring accumulated signal charges of the second field from the respective vertical charge transfer lines to respective storage charge transfer lines; and reading-out accumulated signal charges of the second field from the respective storage charge transfer lines to said amplification means to output amplified time series picture element signals of the second field from said amplification means;

said amplification means separates the time series picture element signals of the first and second fields into corresponding first and second field red, green and blue color components, amplifies the first field red, green, and blue color components with first predetermined amplification factors corresponding to operation shutter speed, and amplifies the second field red, green, and blue color components with second predetermined amplification factors which respectively have inverse relationships to characteristics in which smear components increase as shutter speed increases to reduce smear.

4. The method of operating an image pickup apparatus according to claim 3 wherein the second predetermined amplification factor corresponding to the second field red component is defined as:

$$G_R(T) = \frac{K_R \times R_1(T)}{R_2(T) - R_1(T)}$$

wherein $K_R$ is a red coefficient for adjustment and $R_1(T)$ and $R_2(T)$ are respectively levels corresponding to first and second field red color components.

5. The method of operating an image pickup apparatus according to claim 3 wherein the second predetermined amplification factor corresponding to the second field green component is defined as:

$$G_G(T) = \frac{K_G \times G_1(T)}{G_2(T) - G_1(T)}$$

wherein $K_G$ is a green coefficient for adjustment and $G_1(T)$ and $G_2(T)$ are respectively levels corresponding to first and second field green color components.

6. The method of operating an image pickup apparatus according to claim 3 wherein the second predetermined amplification factor corresponding to the second field blue component is defined as:

$$G_B(T) = \frac{K_B \times B_1(T)}{B_2(T) - B_1(T)}$$

wherein $K_B$ is a blue coefficient for adjustment and $B_1(T)$ and $B_2(T)$ are respectively levels corresponding to first and second field blue color components.

7. The method of operating an image pickup apparatus according to claim 3 wherein said steps of reading-out accumulated signal charges comprises transferring accumulated signal charges from the respective storage charge transfer lines to a horizontal charge transfer line and then subsequently to said application means.

8. A method of operating an image pickup apparatus comprising the steps of:

discharging residual charges produced in picture elements of the image pickup apparatus;

transferring accumulated signal charges of the picture elements which correspond to a first field to respective vertical charge transfer lines, said accumulated signal charges of the first field produced during a first exposure period;

transferring accumulated signal charges of the first field from the vertical charge transfer lines to respective storage charge transfer lines;

transferring accumulated signal charges of the picture elements which correspond to a second field to respective vertical charge transfer lines, said accumulated signal charges of the second field produced during a second exposure period;

reading-out accumulated signal charges of the first field from the respective storage charge transfer lines to amplification means to output amplified time series picture element signals of the first field from said amplification means;

transferring accumulated signal charges of the second field from the respective vertical charge transfer lines to respective storage charge transfer lines; and reading-out accumulated signal charges of the second field from the respective storage charge transfer lines to said amplification means to output amplified time series picture element signals of the second field from said amplification means;

said amplification means separates the amplified time series picture element signals of the first and second fields into corresponding first, second and third color components and amplifies the corresponding second field first and second color components with predetermined amplification factors which respectively have inverse relationships to characteristics in which smear components increase as shutter speed increases, said second exposure period selected to be set according to the third color component so as to have an inverse relationship to a characteristic in which a corresponding color smear component increases as shutter speed increases, to reduce smear.

9. The method of operating an image pickup apparatus according to claim 8 wherein the first, second and third color components are respectively one of the colors red, green, and blue.

10. The method of operating an image pickup apparatus according to claim 9, wherein the third color component is red and said second exposure period is defined as:

$$\tau_2 = \tau_1 \frac{\lambda \times R_1(T)}{R_2(T) - R_1(T)}$$

wherein $\tau_2$ represents said second exposure period $\tau_1$ represents said first exposure period, $\lambda$ is an adjustment coefficient, and $R_1(T)$ and $R_2(T)$ are respectively levels corresponding to first and second field red color components.

11. The method of operating an image pickup apparatus according to claim 10 wherein the first color component is green and the predetermined amplification factor corresponding to the second field green component is defined as:

$$G_G(T) = \frac{K_G \times G_1(T)}{G_2(T) - G_1(T)}$$

wherein $K_G$ is a green coefficient for adjustment and $G_1(T)$ and $G_2(T)$ are respectively levels corresponding to first and second field green color components.

12. The method of operating an image pickup apparatus according to claim 10 wherein the second color component is blue and the predetermined amplification factor corresponding to the second field blue component is defined as:

$$G_B(T) = \frac{K_B \times B_1(T)}{B_2(T) - B_1(T)}$$

wherein $K_B$ is a blue coefficient for adjustment and $B_1(T)$ and $B_2(T)$ are respectively levels corresponding to first and second field blue color components.

13. The method of operating an image pickup apparatus according to claim 8 wherein said steps of reading-out accumulated signal charges comprises transferring accumulated signal charges from the respective storage charge transfer lines to a horizontal charge transfer line and then subsequently to said amplification means.

14. An image pickup apparatus comprising:

photodiode elements, coupled to corresponding transfer elements of vertical charge transfer elements, for accumulating signal charges of an image of interest, said photodiode elements grouped to correspond to first and second fields;

storage charge transfer elements, coupled to said vertical charge transfer elements, for storing accumulated signal charges of said first and second fields;

a horizontal charge transfer line, coupled to said storage charge transfer elements, for transferring accumulated signal charges from said storage charge transfer elements in a horizontal scanning direction to form time series picture element signals of said first and second fields;

timing generating means, operatively coupled to said vertical charge transfer elements, said storage charge transfer elements, and said horizontal charge transfer line, for synchronizing operation thereof;

control means, coupled to said timing generating means, for controlling operation of the image pickup apparatus; and amplification means, operatively coupled to said control means and said horizontal charge transfer line, for separating said time series picture element signals of said first and second fields into corresponding first and second field red, green, and blue color components, amplifying the first field, red, green and blue color components with first predetermined amplification factors corresponding to operation shutter speed, and amplifying the second field red, green, and blue color components with second predetermined amplification factors which respectively have inverse relationships to characteristics in which smear components increase as shutter speed increases to reduce smear.

15. The image pickup apparatus according to claim 14 wherein the second predetermined amplification factor corresponding to the second field red component is defined as:

$$G_R(T) = \frac{K_R \times R_1(T)}{R_2(T) - R_1(T)}$$

wherein $K_R$ is a red coefficient for adjustment and $R_1(T)$ and $R_2(T)$ are respectively levels corresponding to first and second field red color components.

16. The image pickup apparatus according to claim 14 wherein the second predetermined amplification factor corresponding to the second field green component is defined as:

$$G_G(T) = \frac{K_G \times G_1(T)}{G_2(T) - G_1(T)}$$

wherein $K_G$ is a green coefficient for adjustment and $G_1(T)$ and $G_2(T)$ are respectively levels corresponding to first and second field green color components.

17. The image pickup apparatus according to claim 14 wherein the second predetermined amplification factor corresponding to the second field blue component is defined as:

$$G_B(T) = \frac{K_B \times B_1(T)}{B_2(T) - B_1(T)}$$

wherein $K_B$ is a blue coefficient for adjustment and $B_1(T)$ and $B_2(T)$ are respectively levels corresponding to first and second field blue color components.

18. An image pickup apparatus comprising:
photodiode elements, coupled to corresponding transfer elements of vertical charge transfer elements, for accumulating signal charges of an image of interest, said photodiode elements grouped to correspond to first and second fields;
storage charge transfer elements, coupled to said vertical charge transfer elements, for storing accumulated signal charges of said first and second fields accumulated in said photodiode elements during respective first and second exposure periods;
a horizontal charge transfer line, coupled to said storage charge transfer elements, for transferring accumulated signal charges from said storage charge transfer elements in a horizontal scanning direction to form time series picture element signals of said first and second fields;
timing generating means, operatively coupled to said vertical charge transfer elements, said storage charge transfer elements, and said horizontal charge transfer line, for synchronizing operation thereof;
control means, coupled to said timing generating means, for controlling operation of the image pickup apparatus; and
amplification means, operatively coupled to said control means and said horizontal charge transfer line, for separating said time series picture element signals of said first and second fields into corresponding first, second and third color components and amplifying the corresponding second field first and second color components with predetermined amplification factors which respectively have inverse relationships to characteristics in which smear components increase as shutter speed increases,
said second exposure period of said second field selected to be set according to the third color component so as to have an inverse relationship to a characteristic in which a corresponding color smear component increases as shutter speed increases, to reduce smear.

19. The image pickup apparatus according to claim 18 wherein the first, second and third color components are respectively one of the colors red, green, and blue.

20. The image pickup apparatus according to claim 19 wherein the third color component is red and said second exposure period is defined as:

$$\tau_2 = \tau_1 \frac{\lambda \times R_1(T)}{R_2(T) - R_1(T)}$$

wherein $\tau_2$ represents said second exposure period, $\tau_1$ represents said first exposure period, $\lambda$ is an adjustment coefficient, and $R_1(T)$ and $R_2(T)$ are respectively levels corresponding to first and second field red color components.

21. The image pickup apparatus according to claim 20 wherein the first color component is green and the predetermined amplification factor corresponding to the second field green component is defined as:

$$G_G(T) = \frac{K_G \times G_1(T)}{G_2(T) - G_1(T)}$$

wherein $K_G$ is a green coefficient for adjustment and $G_1(T)$ and $G_2(T)$ respectively levels corresponding to first and second field green color components.

22. The image pickup apparatus according to claim 20 wherein the second color component is blue and the predetermined amplification factor corresponding to the second field blue component is defined as:

$$G_B(T) = \frac{K_B \times B_1(T)}{B_2(T) - B_1(T)}$$

wherein $K_B$ is a blue coefficient for adjustment and $B_1(T)$ and $B_2(T)$ are respectively levels corresponding to first and second field blue color components.

* * * * *